United States Patent [19]
Simmons et al.

[11] Patent Number: 6,084,856
[45] Date of Patent: Jul. 4, 2000

[54] METHOD AND APPARATUS FOR ADJUSTING OVERFLOW BUFFERS AND FLOW CONTROL WATERMARK LEVELS

[75] Inventors: Philip Simmons; Robert De Mong, both of San Jose, Calif.

[73] Assignee: Advanced Micro Devices, Inc., Sunnyvale, Calif.

[21] Appl. No.: 08/993,055

[22] Filed: Dec. 18, 1997

Related U.S. Application Data

[60] Provisional application No. 60/038,025, Feb. 14, 1997.

[51] Int. Cl.[7] .............................. H04J 1/16; H04L 1/00; H04L 12/28
[52] U.S. Cl. .......................... 370/235; 370/253; 370/422
[58] Field of Search ..................................... 370/235, 236, 370/229, 253, 252, 445, 422–8, 446, 447, 448; 709/223–4

[56] References Cited

U.S. PATENT DOCUMENTS

| | | |
|---|---|---|
| 5,469,545 | 11/1995 | Vanbuskirk et al. . |
| 5,515,376 | 5/1996 | Murthy et al. . |
| 5,822,540 | 10/1998 | Caldara et al. ..................... 395/200.66 |
| 5,956,322 | 9/1999 | Charny ..................................... 370/232 |

FOREIGN PATENT DOCUMENTS

| | | |
|---|---|---|
| 0 425 202 A2 | 5/1991 | European Pat. Off. . |
| 0 648 034 A1 | 4/1995 | European Pat. Off. . |
| WO 96/13957 | 5/1996 | WIPO . |

OTHER PUBLICATIONS

Lee Melatti, "Fast Ethernet: 100 Mbit/s Made Easy", Data Communications, vol. 23, No. 16, Nov. 1994, pp. 111–112, 114, 116.

*Primary Examiner*—Douglas W. Olms
*Assistant Examiner*—David R Vincent

[57] ABSTRACT

A network switch having a shared memory architecture for storing data frames includes configuration registers that are programmable by a host processor to adaptively adjust overflow buffer locations and flow control watermark levels based on monitored network traffic. The host processor allocates shared resources by setting memory configuration registers corresponding to an external memory, where the network switch uses the external memory for storing received data frames, Management Information Base (MIB) counter values, and output port overflow data. The host processor periodically reads the MIB counter values from the external memory, and adjusts flow control watermark levels or the memory configuration registers in the network switch based on rate-based network traffic derived from the MIB counter values. PCI burst transfers between the host processor and the external memory via the network switch ensure that stored data is not lost during reconfiguration of the external memory. The disclosed arrangement enables resources used by the network switch to be adjusted to minimize congestion by borrowing resources from network ports serving idle stations.

29 Claims, 9 Drawing Sheets

METHOD AND APPARATUS FOR ADJUSTING OVERFLOW BUFFERS AND FLOW CONTROL WATERMARK LEVELS

RELATED APPLICATIONS

This application claims priority from provisional patent application Serial No. 60/038,025, filed Feb. 14, 1997, entitled INTEGRATED MULTIPORT SWITCH, which is incorporated herein by reference.

BACKGROUND OF THE INVENTION

1. Technical Field

The present invention relates to network switching and more particularly, to methods and systems controlling network data traffic on half-duplex and full-duplex media in switched networks.

2. Background Art

Switched local area networks use a network switch for supplying data frames between network stations, where each network station is connected to the network switch by a media. The switched local area network architecture uses a media access control (MAC) enabling network interface cards to access the media. The network switch passes data frames received from a transmitting station to a destination station based on the header information in the received data frame.

Network congestion occurs if a receiving network element, for example a receiving network station, is unable to receive data at a rate greater than or equal to the transmission rate of the transmitting element. For example, traffic in a client-server environment is dominated by client requests followed by a burst of frames from the server to the requesting client. Hence, only a limited number of client requests can be output to the server from the switched hub at the assigned switching port. If the number of client requests exceeds the capacity of the server's port, some of the data packets will be lost. In another example, a client having limited buffer space may be unable to keep up with the transmission rate of a transmitting station, resulting in lost packets. Finally, network congestion may occur if a transmitting station attempts to transmit data packets to a receiving station that is already receiving data packets from another transmitting station. Hence, a receiving station may be unable to keep up with reception of data packets from two separate transmitting stations.

Flow control has been proposed to reduce network congestion, where a sending station temporarily suspends transmission of data packets. A proposed flow control arrangement for a duplex environment, referred to as IEEE 802.3x[2], specifies generation of a flow control message, for example a PAUSE frame. A transmitting station that receives the PAUSE frame enters a PAUSE station in which no frames are sent on the network for a time interval specified in the PAUSE frame. A proposed flow control arrangement for a half-duplex environment, referred to as "back-pressure," causes a receiving station to force a collision with the transmitting station when the receive buffer of the receive station reaches a "receive buffer unavailable" state.

The disclosed flow control proposals, however, assume that flow control should be initiated when a receive buffer is full, which still results in a loss of data. Moreover, the existing proposals do not describe how to determine the instance in which flow control should be initiated. The problem also becomes more complex in a switched environment, where a network switch must route data packets received from a plurality of transmitting stations to the appropriate destination stations. Moreover, if the flow control duration is too short, a receiving station may still lose portions of the transmitted data. If the duration is too long, the transmitting station remains idle, reducing network throughput.

A more fundamental problem is that a network switch tends to have buffers having fixed sizes. Hence, the network switch is incapable of accommodating changes in network traffic due to dynamic characteristics within the network. For example, different network stations may encounter increased activity at different times, whereas other network stations may reach an idle condition. The buffers of an idle station would be underutilized, whereas the buffers of a busy station would tend to become overloaded, requiring flow control to reduce congestion of the overloaded buffers. Hence, the necessity of flow control reduces the bandwidth efficiency of the network, and the use of network ports having predetermined buffer sizes increases the risk of dropped frames on overloaded network ports, while buffers on idle ports remain unutilized.

SUMMARY OF THE INVENTION

In view of the foregoing, there is a need for an arrangement for allocating resources for use by a network switch, where shared resources are selectively allocated and adjusted based upon monitored network traffic.

There is also a need for an arrangement that selectively adjusts flow control thresholds based upon monitored network traffic.

There is also a need for an arrangement that allows shared network resources to be reallocated between network ports without any loss of data.

These and other needs are attained by the present invention, where overflow regions in a shared memory for respective output ports and flow control threshold levels are selectively adjusted by a host processor based upon monitored network traffic.

According to one aspect of the present invention, a method for allocating resources for use by a network switch having a plurality of network ports comprises setting overflow regions in a shared memory for the respective network ports, monitoring network traffic encountered by the network ports over time, and adjusting the overflow regions within the shared memory based on the monitored network traffic. Use of a shared memory for providing overflow regions for the respective network ports enables busy network ports to temporarily store overflow data while the network switch attempts to alleviate congestion. Moreover, the adjustment of overflow regions within the shared memory enables shared resources to be reallocated as needed, such that additional resources may be taken from idle network ports and reassigned to network ports having substantially greater network traffic.

Another aspect of the present invention provides a method for allocating resources for use by a network switch having a plurality of network ports serving respective network stations, the method comprising setting at least one flow control threshold for the network ports, wherein each network port is configured to selectively output a flow control signal based on the at least one flow control threshold relative to a corresponding amount of stored data for the network port, monitoring network traffic encountered by each of the network ports over time, and adjusting the at least one flow control threshold based on the monitored network traffic. Adjusting the flow control threshold based on the monitored network traffic enables the network switch to issue flow control signals, for example PAUSE control frames or back-pressure signals, in an adaptive manner in order to optimize network throughput while minimizing network congestion. A more specific aspect of this invention also enables flow control thresholds to be adjusted for each network port in order to adaptively control the transmission of data by the respective stations. By selectively adjusting flow control thresholds for different stations, stations requiring high priority or high throughput can be accommodated according to one flow control threshold, whereas other network stations having a lower priority or a smaller burst length can be given a lower flow control threshold in order to efficiently manage network traffic.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

DETAILED DESCRIPTION OF ILLUSTRATED EMBODIMENTS

The present invention will be described with the example of a switch in a packet switched network, such as an Ethernet (IEEE 802.3) network. A description will first be given of the switch architecture, followed by the arrangement for regulating network activity according to the present invention. It will become apparent, however, that the present invention is also applicable to other packet switched systems, as described in detail below.

SWITCH ARCHITECTURE

Figure 1:
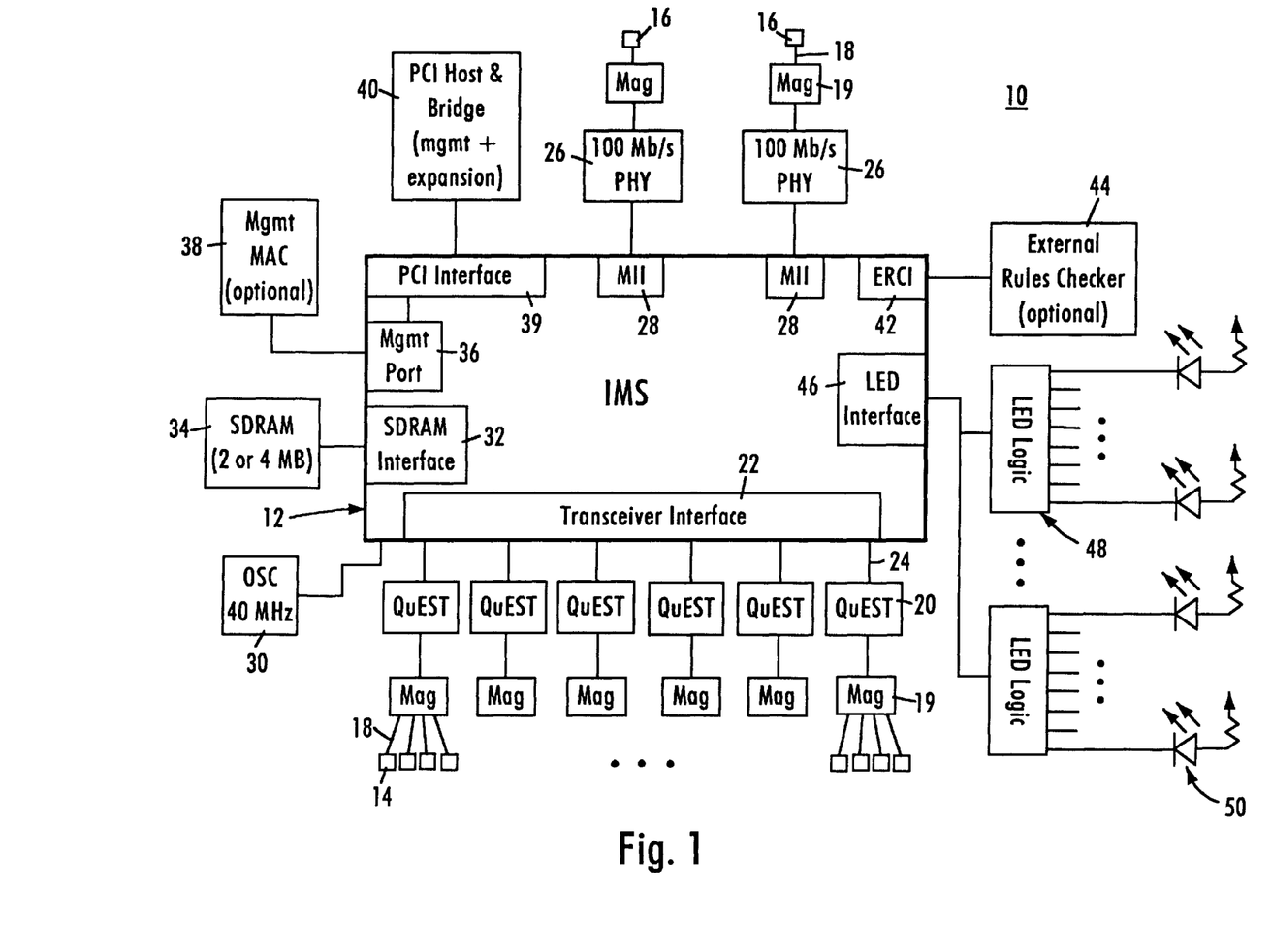
FIG. 1 is a block diagram of a packet switched system constructed in accordance with an embodiment of the present invention.

FIG. 1 is a block diagram of an exemplary system in which the present invention may be advantageously employed. The exemplary system 10 is a packet switched network, such as an Ethernet network. The packet switched network includes an integrated multiport switch (IMS) 12 that enables communication of data packets between network stations. The network may include network stations having different configurations, for example twenty-four (24) 10 megabit per second (Mb/s) network stations 14 that send and receive data at a network data rate of 10 Mb/s, and two 100 Mb/s network stations 16 that send and receive data packets at a network speed of 100 Mb/s. The multiport switch 12 selectively forwards data packets received from the network stations 14 or 16 to the appropriate destination based upon Ethernet protocol.

According to the disclosed embodiment, the 10 Mb/s network stations 14 send and receive data packets to and from the multiport switch 12 via a media 18 and according to half-duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished or prioritized over the medium 18. Rather, each station 14 includes an Ethernet interface card that uses carrier-sense multiple access with collision detection (CSMA/CD) to listen for traffic on the media. The absence of network traffic is detected by sensing a deassertion of a receive carrier on the media. Any station 14 having data to send will attempt to access the channel by waiting a predetermined time after the deassertion of a receive carrier on the media, known as the interpacket gap interval (IPG). If a plurality of stations 14 have data to send on the network, each of the stations will attempt to transmit in response to the sensed deassertion of the receive carrier on the media and after the IPG interval, resulting in a collision. Hence, the transmitting station will monitor the media to determine if there has been a collision due to another station sending data at the same time. If a collision is detected, both stations stop, wait a random amount of time, and retry transmission.

The 100 Mb/s network stations 16 preferably operate in full-duplex mode according to the proposed Ethernet standard IEEE 802.3x Full-Duplex with Flow Control - Working Draft (0.3). The full-duplex environment provides a two-way, point-to-point communication link between each 100 Mb/s network station 16 and the multiport switch 12, where the IMS and the respective stations 16 can simultaneously transmit and receive data packets without collisions. The 100 Mb/s network stations 16 each are coupled to network media 18 via 100 Mb/s physical (PHY) devices 26 of type 100 Base-TX, 100 Base-T4, or 100 Base-FX. The multiport switch 12 includes a media independent interface (MII) 28 that provides a connection to the physical devices 26. The 100 Mb/s network stations 16 may be implemented as servers or routers for connection to other networks. The 100 Mb/s network stations 16 may also operate in half-duplex mode, if desired. Similarly, the 10 Mb/s network stations 14 may be modified to operate according to full-duplex protocol with flow control.

As shown in FIG. 1, the network 10 includes a series of switch transceivers 20 that perform time division multiplexing and time division demultiplexing for data packets transmitted between the multiport switch 12 and the 10 Mb/s stations 14. A magnetic transformer module 19 maintains the signal waveform shapes on the media 18. The multiport switch 12 includes a transceiver interface 22 that transmits and receives data packets to and from each switch transceiver 20 using a time-division multiplexed protocol across a single serial non-return to zero (NRZ) interface 24. The switch transceiver 20 receives packets from the serial NRZ interface 24, demultiplexes the received packets, and outputs the packets to the appropriate end station 14 via the network media 18. According to the disclosed embodiment, each switch transceiver 20 has four independent 10 Mb/s twisted-pair ports and uses 4:1 multiplexing across the serial NRZ interface enabling a four-fold reduction in the number of PINs required by the multiport switch 12.

The multiport switch 12 contains a decision making engine, switching engine, buffer memory interface, configuration/control/status registers, management counters, and MAC (media access control) protocol interface to support the routing of data packets between the Ethernet ports serving the network stations 14 and 16. The multiport switch 12 also includes enhanced functionality to make intelligent switching decisions, and to provide statistical network information in the form of management information base (MIB) objects to an external management entity, described below. The multiport switch 12 also includes interfaces to enable external storage of packet data and switching logic in order to minimize the chip size of the multiport switch 12. For example, the multiport switch 12 includes a synchronous dynamic RAM (SDRAM) interface 32 that provides access to an external memory 34 for storage of received frame data, memory structures, and MIB counter information. The memory 34 may be an 80, 100 or 120 MHz synchronous DRAM having a memory size of 2 or 4 Mb.

The multiport switch 12 also includes a management port 36 that enables an external management entity to control overall operations of the multiport switch 12 by a management MAC interface 38. The multiport switch 12 also includes a PCI interface 39 enabling access by the management entity via a PCI host and bridge 40. Alternatively, the PCI host and bridge 40 may serve as an expansion bus for a plurality of IMS devices 12.

The multiport switch 12 includes an internal decision making engine that selectively transmits data packets received from one source to at least one destination station. The internal decision making engine may be substituted with an external rules checker. The multiport switch 12 includes an external rules checker interface (ERCI) 42 that allows use of an external rules checker 44 to make frame forwarding decisions in place of the internal decision making engine. Hence, frame forwarding decisions can be made either by the internal switching engine or the external rules checker 44.

The multiport switch 12 also includes an LED interface 46 that clocks out the status of conditions per port and drives LED external logic 48. The LED external logic 48, in turn, drives LED display elements 50 that are human readable. An oscillator 48 provides a 40 MHz clock input for the system functions of the multiport switch 12.

Figure 2:
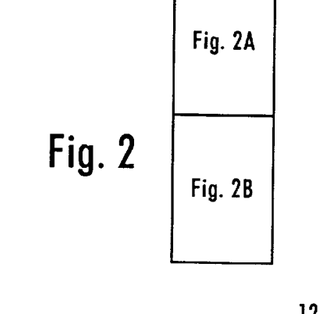
FIGS. 2, 2A and 2B are block diagrams of a multiport switch constructed in accordance with an embodiment of the present invention and used in the packet switched system of FIG. 1.
Figure 2A:
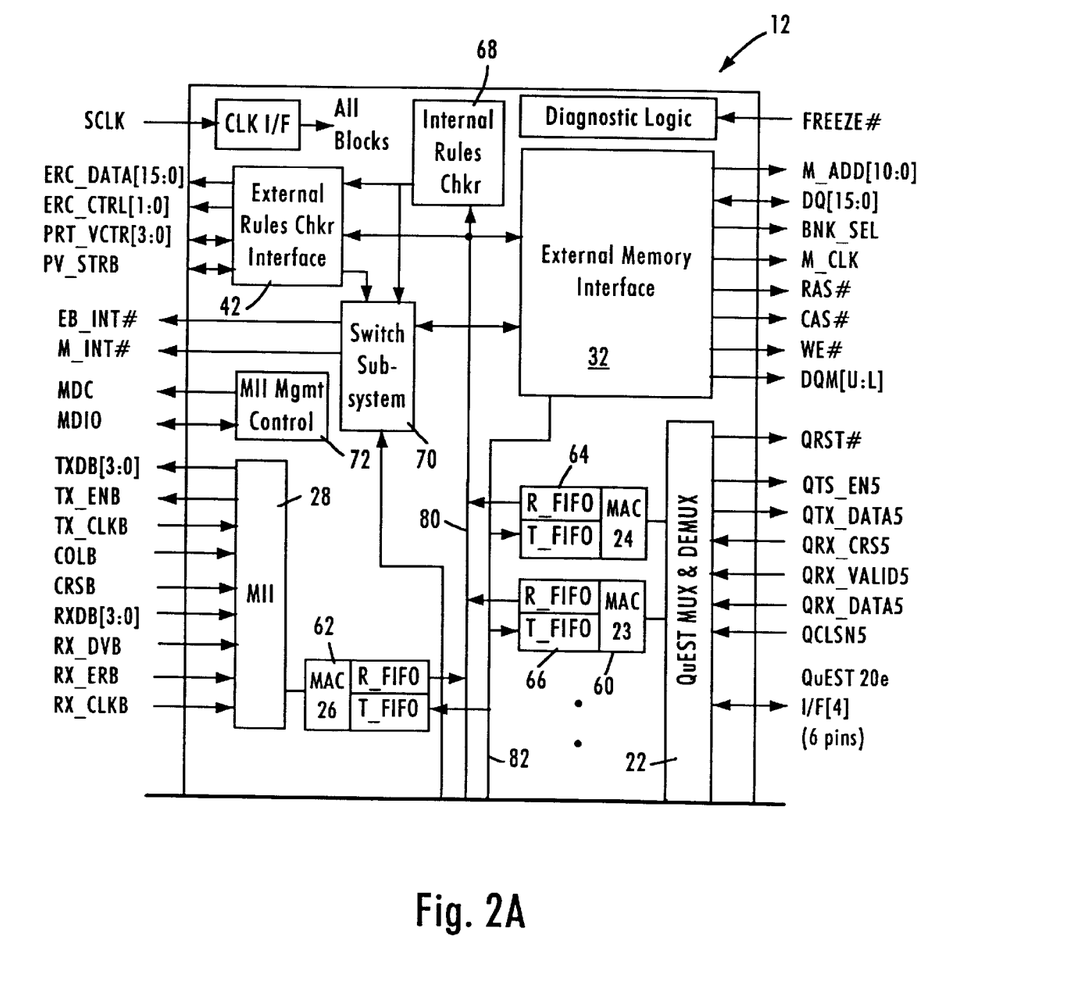
Figure 2B:
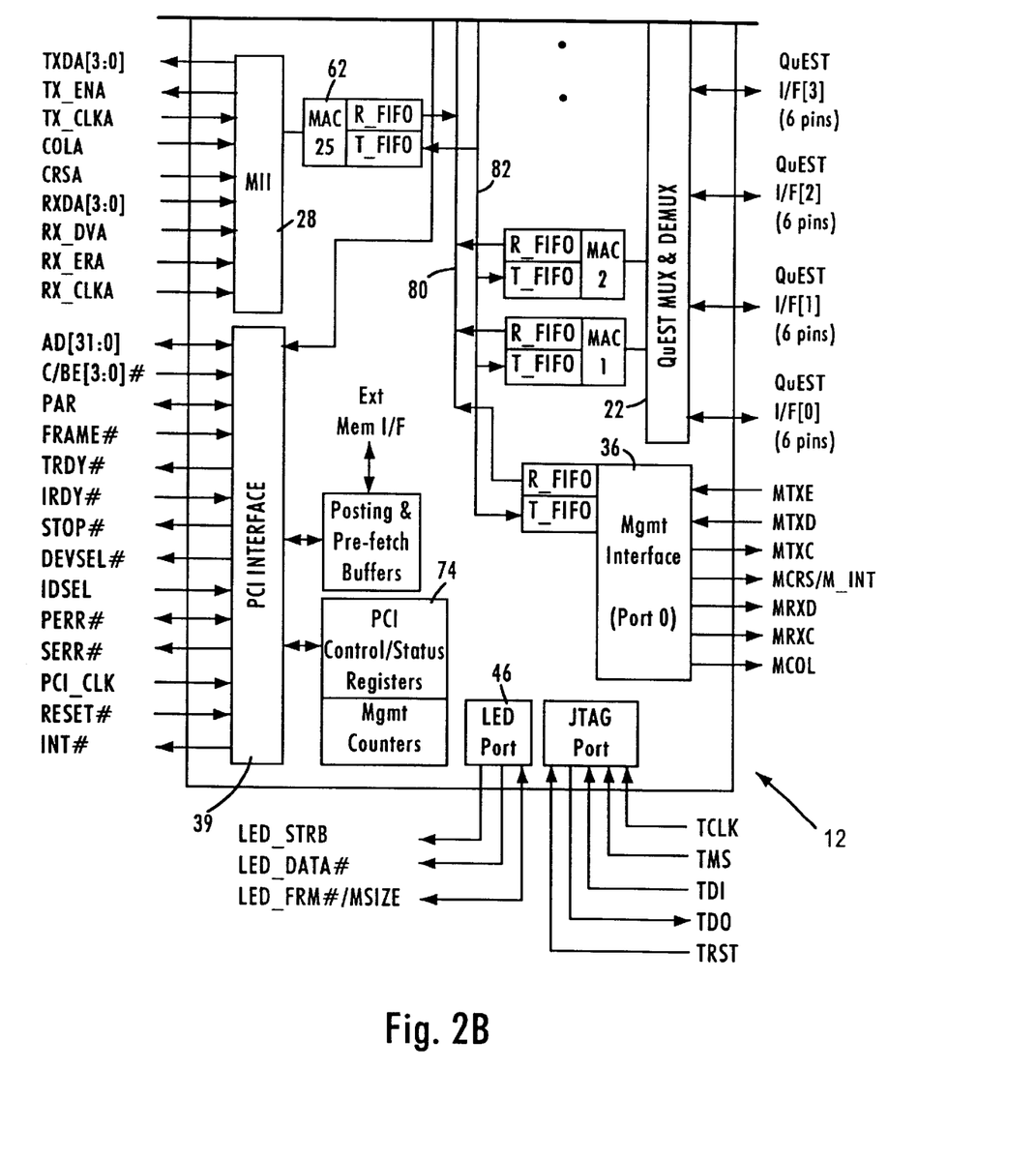

FIG. 2 is a block diagram of the multiport switch 12 of FIG. 1. The multiport switch 12 includes twenty-four (24) 10 Mb/s media access control (MAC) ports 60 for sending and receiving data packets in half-duplex between the respective 10 Mb/s network stations 14 (ports 1–24), and two 100 Mb/s MAC ports 62 for sending and receiving data packets in full-duplex between the respective 100 Mb/s network stations 16 (ports 25, 26). As described above, the management interface 36 also operates according to MAC layer protocol (port 0). Each of the MAC ports 60, 62 and 36 has a receive first in-first out (FIFO) buffer 64 and transmit FIFO 66. Data packets from a network station are received by the corresponding MAC port and stored in the corresponding receive FIFO 64. The received data packet is output from the corresponding receive FIFO 64 to the external memory interface 32 for storage in the external memory 34.

The header of the received packet is also forwarded to a decision making engine, comprising an internal rules checker 68 and an external rules checker interface 42, to determine which MAC ports will output the data packet. Specifically, the packet header is forwarded to an internal rules checker 68 or the external rules checker interface 42, depending on whether the multiport switch 12 is configured to operate using the internal rules checker 68 or the external rules checker 44. The internal rules checker 68 and external rules checker 44 provide the decision making logic for determining the destination MAC port for a given data packet. The decision making engine may thus output a given data packet to either a single port, multiple ports, or all ports (i.e., broadcast). For example, each data packet includes a header having source and destination address, where the decision making engine may identify the appropriate output MAC port based upon the destination address. Alternatively, the destination address may correspond to a virtual address that the appropriate decision making engine identifies as corresponding to a plurality of network stations. Alternatively, the received data packet may include a VLAN (virtual LAN) tagged frame according to IEEE 802.1d protocol that specifies another network (via a router at one of the 100 Mb/s stations 16) or a prescribed group of stations. Hence, either the internal rules checker 68 or the external rules checker 44 via the interface 42 will decide whether a frame temporarily stored in the buffer memory 34 should be output to a single MAC port or multiple MAC ports.

Use of the external rules checker 44 provides advantages such as increased capacity, a random-based ordering in the decision queue that enables frame forwarding decisions to be made before the frame is completely buffered to external memory, and enables decisions to be made in an order independent from the order in which the frames were received by the multiport switch 12.

The decision making engine (i.e., internal rules checker 68 or the external rules checker 44) outputs a forwarding decision to a switch subsystem 70 in the form of a port vector identifying each MAC port that should receive the data packet. The port vector from the appropriate rules checker includes the address location storing the data packet in the external memory 34, and the identification of the MAC ports to receive the data packet for transmission (e.g., MAC ports 0–26). The switch subsystem 70 fetches the data packet identified in the port vector from the external memory 34 via the external memory interface 32, and supplies the retrieved data packet to the appropriate transmit FIFO 66 of the identified ports.

Additional interfaces provide management and control information. For example, a management data interface 72 enables the multiport switch 12 to exchange control and status information with the switch transceivers 20 and the 100 Mb/s physical devices 26 according to the MII management specification (IEEE 802.3u). For example, the management data interface 72 outputs a management data clock (MDC) providing a timing reference on the bidirectional management data IO (MDIO) signal path.

The PCI interface 39 is a 32-bit PCI revision 2.1 compliant slave interface for access by the PCI host processor 40 to internal IMS status and configuration registers 74, and access external memory SDRAM 34. The PCI interface 39 can also serve as an expansion bus for multiple IMS devices. The management port 36 interfaces to an external MAC engine through a standard seven-wire inverted serial GPSI interface, enabling a host controller access to the multiport switch 12 via a standard MAC layer protocol.

Figure 3:
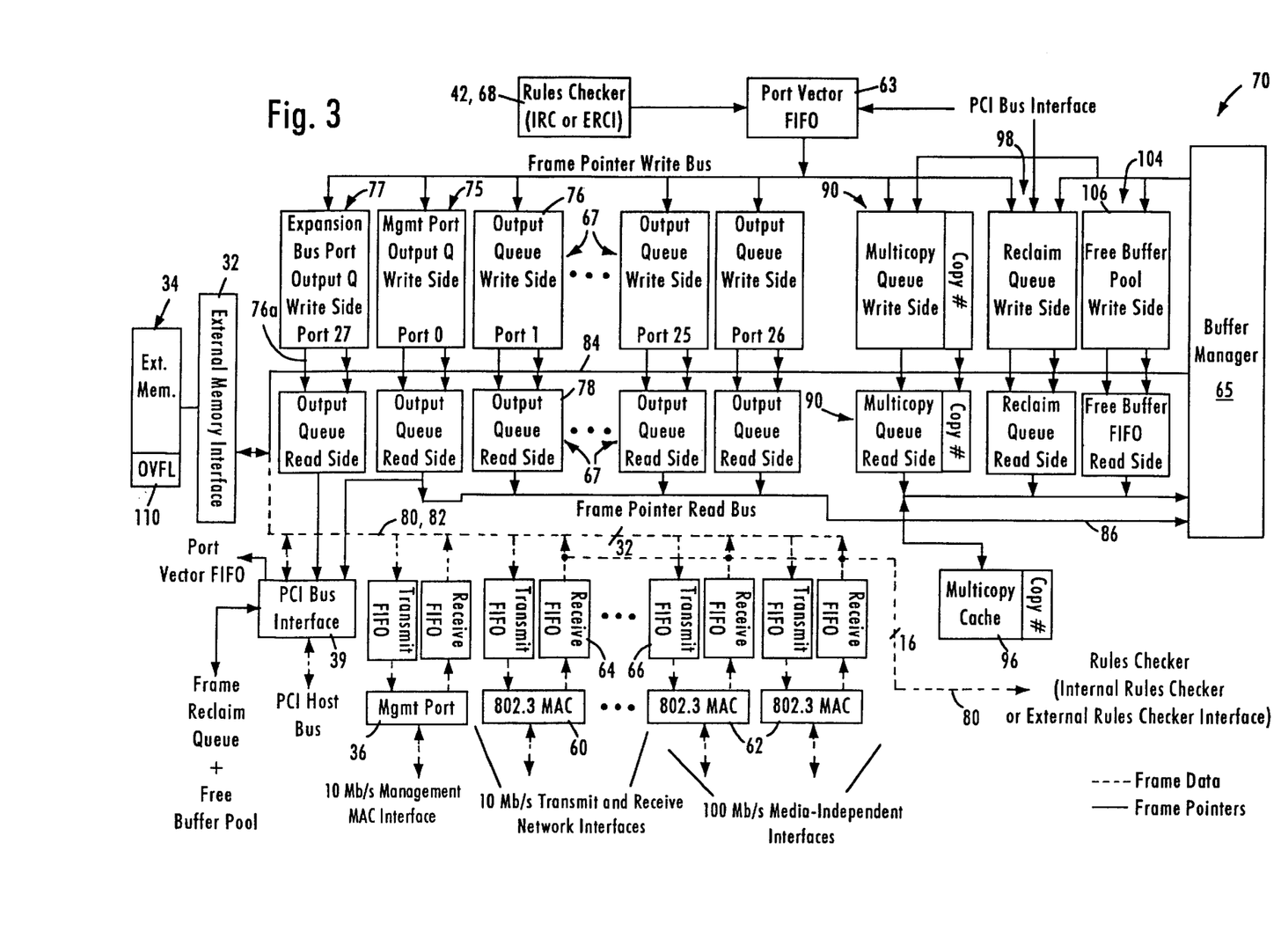
FIG. 3 is a schematic depiction of a switch subsystem of the multiport switch of FIG. 3, constructed in accordance with an embodiment of the present invention.

FIG. 3 depicts the switch subsystem 70 of FIG. 2 according to an exemplary embodiment of the present invention. Other elements of the multiport switch 12 of FIG. 2 are reproduced in FIG. 3 to illustrate the connections of the switch subsystem 70 to these other elements. The switch subsystem 70 contains the core switching engine for receiving and forwarding frames. The main functional blocks used to implement the switching engine include: a port vector FIFO 63, a buffer manager 65, a plurality of port output queues 67, a management port output queue 75, an expansion bus port output queue 77, a free buffer pool 104, a multicopy queue 90, a multicopy cache 96 and a reclaim queue 98. The operation and structure of these functional blocks will be described in more detail, but a brief overview of the switch subsystem 70 of FIG. 3 is first presented to provide context to the later discussion of the individual elements.

There are two basic types of frames that enter the multiport switch 12 from the ports: unicopy frames and multicopy frames. A unicopy frame is a frame that is received at a port which is to be transmitted by the multiport switch 12 to only one other port. By contrast, a multicopy frame is a frame that is received at one port for transmission to more than one port. In FIG. 3, each port is represented by a corresponding MAC 60, 62, or 36 having its own receive FIFO 64 and transmit FIFO 66.

Frames, whether unicopy or multicopy, are received by the internal MAC engines 60, 62, or 36, and placed in the corresponding receive FIFO 64. Each data frame has a header including at least a destination address, a source address, and type/length information. The header is provided to a rules checker (i.e., either the internal rules checker 68 or the external rules checker interface 42). The rules checker, based on the information in the header, determines from where the frame packet will be cast, i.e., through which port or ports will the frame packet be transmitted.

At the same time as the rules checker 42 or 68 is making its forwarding determination, the buffer manager 65 obtains a free frame pointer from the free buffer pool 104. The free frame pointer specifies a location in external memory 36 available for storing the data frame currently stored in the receive FIFO 64. The buffer manager 65 transfers the data frame from the receive FIFO 64 over a data bus 80 (see FIG. 2) to the external memory 34 in a direct memory access (DMA) transaction, and the data frame is stored in the location pointed to by the free frame pointer obtained from the free buffer pool 104.

The buffer manager 65 also sends the free frame pointer to the rules checker 42 or 68 to enable the appropriate rules checker to process the header information while maintaining the storage location of the data frame. This free buffer pointer is now referred to merely as a frame pointer, since it points to the memory location in the external memory 34 where the frame is stored. The rules checker 42 or 68 makes the forwarding decision, where the rules checker identifies at least one destination port for the data frame stored in the external memory 34 based on the corresponding header information, and generates a forwarding instruction in the form of a "port vector". In the exemplary illustrated embodiment, the port vector is a 28-bit vector with a bit set for each output port identified as a destination port to which the data frame should be forwarded. Assuming that the received frame is a unicopy frame, only one bit corresponding to the one destination port is set in the port vector generated by the rules checker 42 or 68. Hence, the rules checker uses the port vector to assign the frame pointer to at least one destination port.

The rules checker 42 or 68 places the port vector and the corresponding frame pointer (as well as a control opcode and a VLAN index) into the port vector FIFO 63. The port vector is examined by the port vector FIFO 63 to determine into which particular output queue 67 (or queues) the frame pointer associated with the port vector should be input. The port vector FIFO 63 assigns the frame pointer to the appropriate destination port(s) by placing the frame pointer into the top of the appropriate output queue 67, queuing the transmission of the data frame from the corresponding destination port. Hence, the frame pointer becomes an "assigned frame pointer," where it is assigned to a destination port.

At some point in time, the assigned frame pointer reaches the bottom of the output queue 67 after passing through the output queue 67. The buffer manager 65 takes the assigned frame pointer from the bottom of the output queue 67 using a frame pointer read bus 86, fetches the corresponding data frame in a DMA transaction from the location in external memory 34 pointed to by the assigned frame pointer, and places the fetched data frame into the appropriate transmit FIFO 66 via a data bus 82 (see FIG. 2) for transmission by the corresponding MAC layer.

A multicopy transmission is similar to the unicopy transmission, except that the port vector has multiple bits set, designating the multiple destination ports from which the frame will be transmitted. The frame pointer is assigned (i.e., stored in) each of the appropriate output queues 67 and transmitted from the corresponding transmit FIFOs 54.

The buffer manager 65 uses the special control queues, e.g., the free buffer pool 104, the multicopy queue 90, the reclaim queue 98, and the multicopy cache 96 to manage the process of allocating buffers to store received data frames, and retrieving buffers for re-use once the frame has been transmitted to its designated output port(s). The buffer manager 65 also maintains "overflow" regions in external memory 36 for the output queues 67, 75, 77 and the control queues 104, 90 and 98. Specifically, these queues each include a three-part configuration including on-chip and off-chip storage locations. On-chip storage is preferable for high performance, where all of the queuing structure is maintained on the chip (referring to the multiport switch 12). However, the real estate on a chip is very expensive and real estate costs create a problem when the chip is designed to switch, and needs to queue, a large number of entries. The present invention solves this dilemma by providing a single output queue that includes a high performance, low capacity section that is on-chip, and an overflow area that is off-chip, i.e., is implemented on a separate discrete memory chip 34. The overflow area thus allows the queue to serve as a large capacity queue as needed, and is configured within the output queue in a manner that the a relatively lower performance of the off-chip overflow area does not adversely affect the overall performance of the output queue.

Each logical queue 67, 75, 77, 90, 98, and 104 of the present invention includes a write-side queue 76 and a read-side queue 78 located on the chip 12, and an output queue overflow area (generally designated as 110) located in an assigned portion of the external memory 34. Access to the external memory 34 for all of the output queues 67 is through the external memory interface 32, as described earlier. The present invention takes advantage of the bursting nature of current external memories, so that the overflow data (e.g., frame pointers) is sent on and off the chip to the overflow queue area 110 in bursts over the bus 84 to the external memory 34.

The write-side queue 76 and the read-side queue 78 located on the chip 12 are considered to be small, expensive, and high-performance resources. By contrast, the overflow area 110, forming the third part of the output queue 67, provides a large, inexpensive, low-performance, large capacity path.

Each buffer 67, 75, 77, 90, 98, and 104 operates by the corresponding write-side queue 76 receiving the corresponding frame pointer entry at an input end of the write-side queue 76. The frame pointer points to the first buffer location in external memory storing the first 256 bytes of a data frame.

After the entry flows through and reaches the output end at the bottom of the write-side queue 76, control logic associated with the output queue 67 selects whether the entry should be output to the corresponding assigned portion 110 of the external memory 34 or the read-side queue 78. If there is available space in the read-side queue 78, and the overflow area 110 for that output queue 67 is empty, then one or more entries are passed directly from the write-side queue 76 to the read-side queue 78. This passing of the entry or entries directly from the write-side queue 76 to the read-side queue 78 is performed entirely on the chip 12, and thus provides a low-latency, fast flow-through of an entry.

If the read-side queue 78 is full, but there is not yet a burst-size amount of data in the write-side queue 76, then the entry remains in the write-side queue 76. If the read-side queue 78 is full and there is at least a burst-size amount of data (e.g., 16 bytes worth of entries) in the write-side queue 76, then the data is written in a burst fashion by the buffer manager 65 into the overflow area 110 in the corresponding assigned portion of the external memory 34. Eventually, the read-side queue 78 will empty, and if there is data in the overflow area 110, the buffer manager 65 will supply a burst of data from the overflow area 110 into the read-side queue 78 when the read-side queue 78 has enough space to accommodate the burst-size amount of data. Hence, the read-side queue 78 selectively receives the frame pointer from the write-side queue 76 or the assigned portion 110 of the external memory 34.

Hence if an output queue 67 begins to receive a large number of entries (e.g., frame pointers), these entries can be placed into the overflow area 110 to avoid overflowing the on-chip queue 78, minimizing possibility of discarding frames. The total amount of memory dedicated to the overflow areas 110 may also be readily changed by changing the size of the external memory 36. Furthermore, the sizes of the individual specific overflow areas 110 are programmable to customize the queue sizes, without impacting the performance of the output queues 74.

The multiport switch as depicted in FIGS. 1 and 2 has twenty-eight output queues serving the twenty-four 10 Mb/s user ports 60, the two 100 Mb/s server ports 62, the management port 36, and the expansion bus port 38, respectively. The output queues 67, 75 and 77 provide temporary storage for frame pointers when they are queued for transmission. Queuing takes the form of the port vector FIFO 70 writing frame pointers into the various output queues 67, 75 and 77 indicated in a forwarding port vector.

Figure 5:
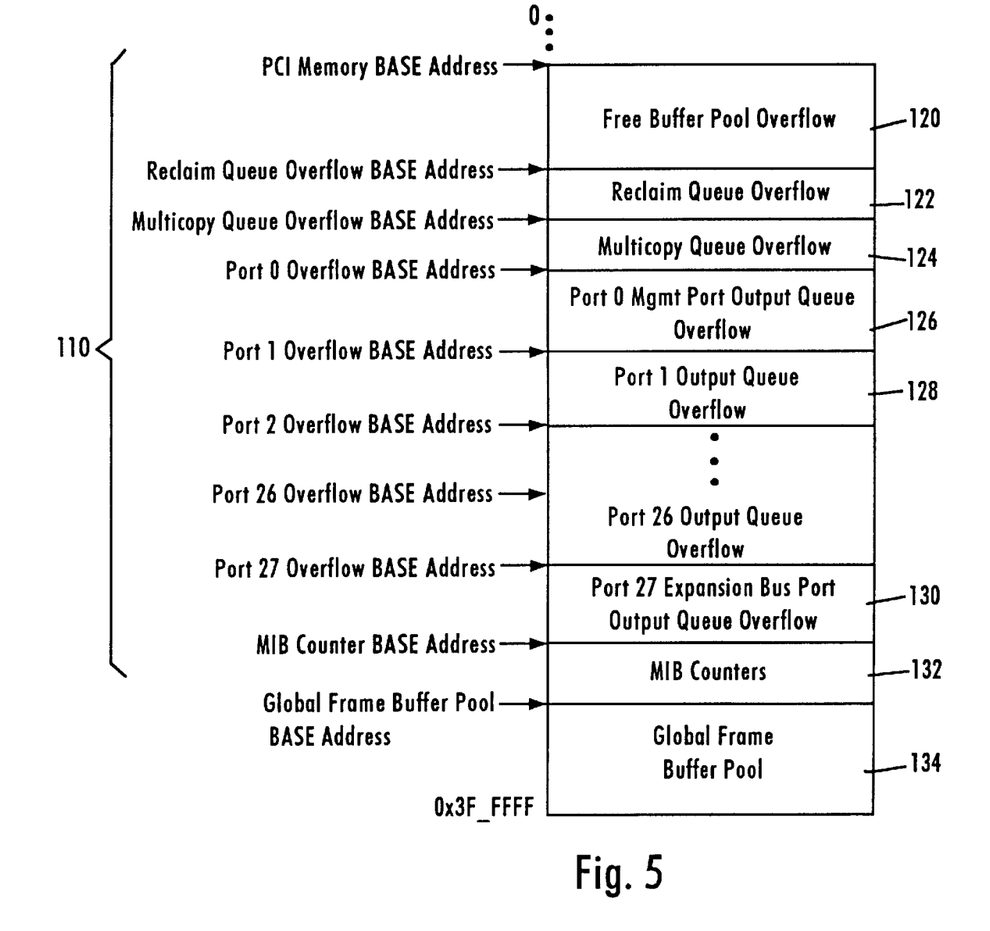
FIG. 5 is a memory map diagram of the external memory of FIG. 1, configured in accordance with an embodiment of the present invention.

FIG. 5 is a diagram illustrating an exemplary map of the external memory 34. The overall capacity of the external memory 34 may be, for example, 4 Mb, although other capacity memories are employed in different embodiments. The use of an external memory 34 for the overflow areas according to the present invention permits increasing or decreasing the size of the output queues by simply changing the external memory. This is an advantage over systems in which the queue structure is entirely on the chip, as the overall queuing capacity is set at manufacture of the chip.

To satisfy the overflow storage requirements of the switch 12, the overflow region 110 of the external memory 34 has assigned memory portions for a free buffer pool overflow 120, a reclaim queue overflow 122, a multicopy queue overflow 124, a management port output queue overflow 126, output queue overflows 128 for each of the 10 Mb/s and 100 Mb/s destination ports (Ports 0–26), and an expansion bus port (Port 27) output queue overflow 130. The memory 34 also includes assigned portions for the MIB counters 132, and the global frame buffer pool 134.

The BASE Address for the entire memory region is programmable in a memory base address register among the registers 74 on the chip. The BASE Address for each area in the external memory map is programmable in the register set. No length register is required, since the length for a given area is equal to the area from that area's BASE Address to the BASE Address of the next adjacent area in the mapping.

Since the length (and therefore capacity) of each of the individual overflow areas is programmable, the overall capacity of each queue is programmable. This feature of the present invention permits customization of the switch to provide particular output queues with increased capacity, as needed.

The overflow areas 110 store excess entries that do not fit into the control queues on the chip 12. For example, the free buffer pool overflow area 120 stores for the free buffer pool 104 the excess free frame pointers identifying the currently unused buffers in the global frame buffer pool 134. The reclaim queue overflow area 122 stores for the reclaim queue 98 excess frame pointers to linked-list chains that are no longer needed. The multicopy queue overflow area 124 stores for the multicopy queue 90 excess frame pointers with copy numbers ">=1" (for queued frame pointers) and frame pointers with copy numbers "−1" (for successfully transmitted frames). The management port output queue overflow area 126 stores for the management port queue 74 excess assigned frame pointers awaiting transmission to the management port 36 (Port 0). Output queue overflow areas 128 store excess assigned frame pointers awaiting transmission to the appropriate 10 Mb/s ports (Ports 1–24) or 100 Mb/s ports (Ports 25–26) for the respective port queues 67. The expansion bus port output queue overflow area 130 for the expansion bus port (Port 27) queue 77 stores frame pointers awaiting transmission to the expansion bus port.

The MIB counter region 132 contains all the per port statistics which are updated periodically by the switch 12. The switch 12 maintains 8-bit and 16-bit counters on-chip for storing MIB statistics. The switch 12 updates the 32-bit or 64-bit MIB counters in external memory 36 with the frequency required to prevent loss of MIB data.

The global frame buffer pool 134 contains buffers in linked-lists which store received frame data. At any given time, these linked lists contain valid frame data, obsolete buffers which will be returned by the buffer manager 72 to the free buffer pool 104, or locations owned by the PCI host processor (not shown).

REGULATING NETWORK ACTIVITY

The present invention is directed to selectively outputting data frames from a transmitting station to a destination station. The multiport switch 12 uses flow-control to regulate inbound network activity when internal resources deplete to certain user-definable thresholds, described in detail below. Specifically, flow control is initiated when a frame received on a network port is to be supplied to a resource within the multiport switch that has limited capacity, determined by the resource contents passing a prescribed threshold. In the case of a half-duplex port, flow control is initiated when the multiport switch 12 outputs a phantom packet that forces a collision on the receiving port of the transmitting station, also referred to as back-pressure. Flow control is implemented in a full-duplex port, according to the IEEE 802.3x standard, by the generation of MAC control PAUSE frames that inhibit transmission of data frames for a specified period of time. The multiport switch 12 supports back-pressure on all network ports (Ports 0–26) operating in half-duplex mode and generation of PAUSE frames by the 100 Mb/s ports 62. If desired, the 10 Mb/s ports may also be configured to provide full-duplex flow control.

Back-pressure is generated on a half-duplex port by forcing a collision during reception of a specific frame from a transmitting station. As described in detail below, the collision is forced by the multiport switch 12 outputting a phantom packet to the transmitting station within a prescribed interval of receiving a portion of the data frame. Transmission of the phantom frame causes the sending station to abort transmission, jam, and perform the Truncated Binary Exponential Back-off (TBEB) algorithm prior to retransmission. The multiport switch 12 thus has the opportunity to transmit its own data frame to free up the output buffers 67 during the time that the previously transmitting station is deferring according to the TBEB algorithm.

A particular feature of the present invention is that the multiport switch 12 must make a decision quickly (e.g., within one-half slot time) whether to assert a collision with the incoming frame. Hence, back-pressure is used only when the internal rules checker 68 is active. Back-pressure can apply equally to unicast and multicast frames.

Figure 4:
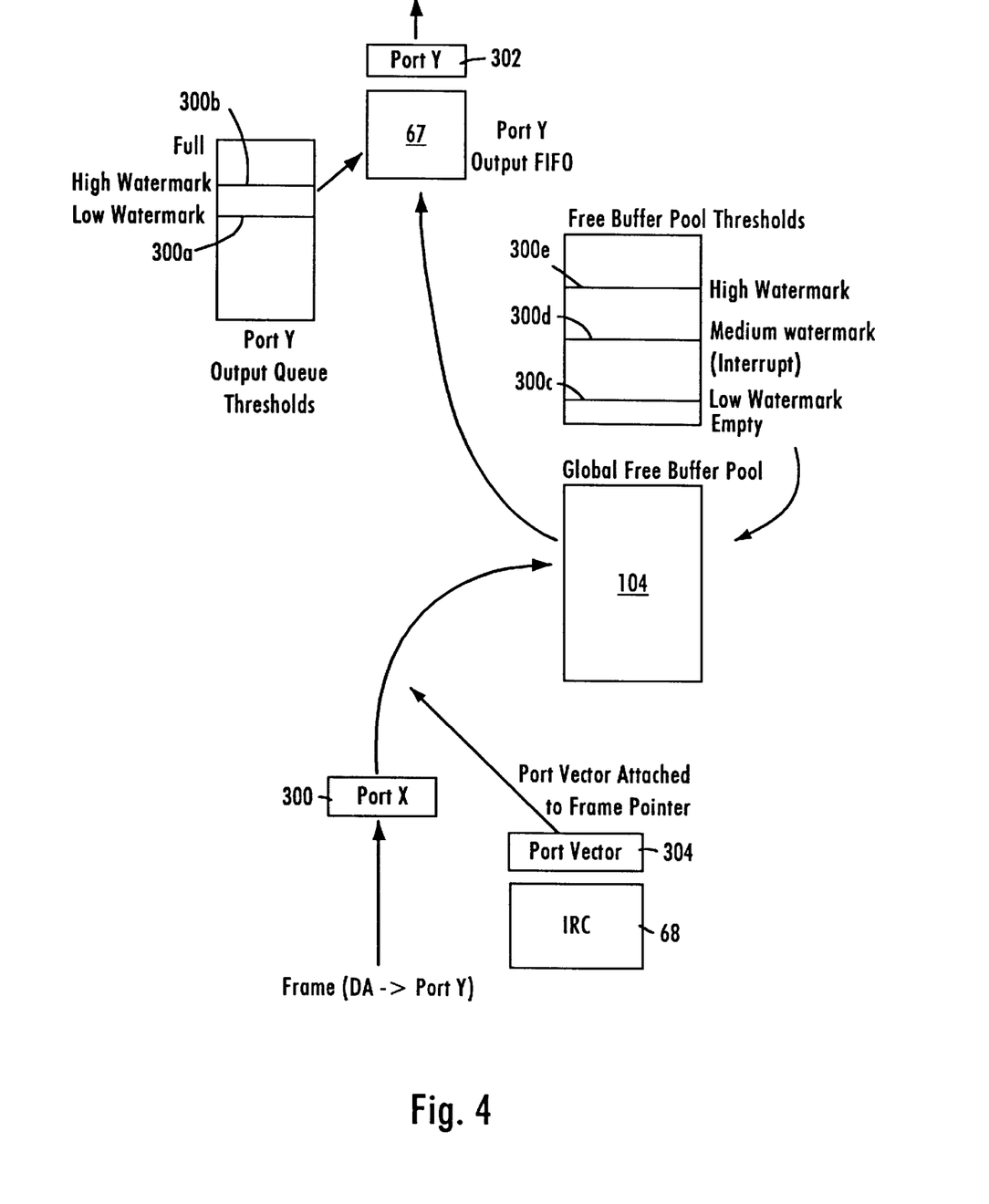
FIG. 4 is a diagram illustrating relationships between buffers and watermark threshold levels in the switch subsystem of FIG. 3 in accordance with an embodiment of the present invention.

FIG. 4 is a diagram illustrating the relationship between watermark threshold levels used to determine whether flow control should be applied relative to the associated buffers. As described below, the watermark threshold levels are programmed using an external host processor 40 to selectively generate flow control frames (e.g., phantom frames or PAUSE frames) when buffer resources are limited. Each output port queue 67 has a low watermark threshold 300*a* and a high watermark threshold 300*b*. As described below, each output port may have its own corresponding set of low and high watermarks 300*a* and 300*b*. The free buffer pool 104 has three watermarks configured in the registers 220, namely low, medium, and high free buffer pool thresholds 300*c*, 300*d*, and 300*e*, respectively.

As illustrated in FIG. 4, a receiving port 300 will begin to receive a data frame from a transmitting station according to Ethernet protocol. The rules checker 68 will identify the destination port 302, for example "port y," and will generate the appropriate port vector 304.

According to the disclosed embodiment, if the receiving port 300 is operating in half-duplex mode, two conditions can cause back-pressure to occur on the receiving port 300:

(1) if the output queue 67 for the destination port 302 (e.g., port y) is filled equal or above the high watermark 300*b*, and the destination port 302 is identified by the internal rules checker 68 within half a slot time of starting to receive the frame, then back-pressure will be asserted on the receiving port 300 (e.g., port x).

(2) if the output queue 67 for the destination port 302 is equal to or above the low watermark 300*a*, and the free buffer pool 104 is equal to or below the low watermark 300*c*, and the destination port 302 is identified by the internal rules checker 68 within half a slot time of starting to receive the frame, then back-pressure will be asserted on port 300.

If the port output queue low watermark 300*a* equals the high watermark 300*b*, then back-pressure will be asserted independent of the free buffer pool level. If the high watermark is set to 0xFFF, then the high watermark is disabled and back-pressure is asserted only when the port output queue low watermark is exceeded and the free buffer pool drops below its low watermark.

Back-pressure is asserted by generating a phantom frame, output by the multiport switch 12, in order to deliberately cause a collision. The phantom frame is an unrecognizable data frame that cannot be mistakenly interpreted as valid data, for example, the phantom frame is preferably a continuous stream of alternating ones and zeroes. The length of the phantom frame is preferably 568 bits long, which is less than the minimum sized frame, in order to be interpreted as a runt frame. Hence, the phantom frame has a length less than the prescribed minimum length for Ethernet data packets to ensure that the phantom frame is not erroneously interpreted as valid data. When the transmitting station detects the collision, the transmitting station will abort transmission, jam, perform the backup algorithm, and attempt to retransmit the frame. The multiport switch 12 will thus have the opportunity to clear some of its queues during the time that the transmitting station is executing the back-off algorithm.

If flow control is enabled and the receiving port operates in full-duplex, whenever the number of available buffers in the free buffer pool 104 falls below the high watermark 300*e*, the medium watermark 300*d*, or the low watermark 300*c*, the multiport switch completes any current transmission in progress, and causes the receiving port 300 to transmit a PAUSE frame carrying a short, medium, or long PAUSE interval, respectively, on both 100 Mb/s ports.

Specifically, each port can be configured by the host processor 40 to have its own set of PAUSE intervals between a range including of 0 to 65535 slot times. Hence, each port may have, for example a short pause interval (e.g., 5 slot times), a medium pause interval (e.g., 100 slot times), and a long pause interval (e.g., 2048 slot times). Hence, if multiport switch 12 encounters severe incoming traffic causing the free buffer pool 104 to fall below the high watermark 300*e*, the medium watermark 300*d*, and the low watermark 300*c*, then each full duplex receiving port 300 will output a PAUSE frame carrying the respective pause interval.

Figure 6:
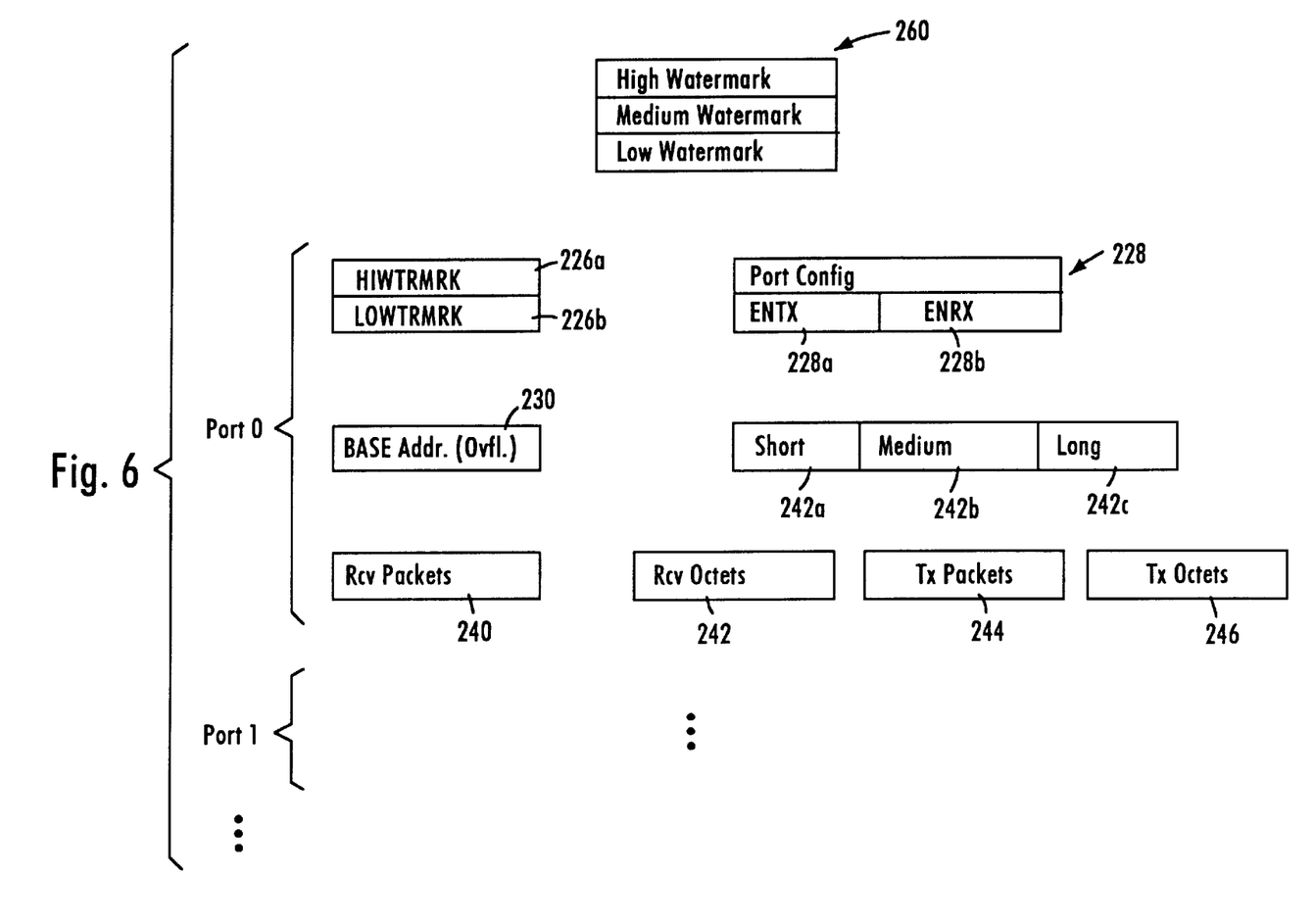
FIG. 6 is a diagram illustrating registers within the multiport switch of FIG. 2 for use in allocating the overflow areas of the external memory of FIG. 5 and setting flow control thresholds according to an embodiment of the present invention.

FIG. 6 is a diagram illustrating configuration registers and traffic counters for each network port according to an embodiment of the present invention. Specifically, the registers 74 of FIG. 2 include a programmable threshold register 260 for the free buffer pool 104, and a plurality of programmable registers and counters for each network port.

As shown in FIG. 6, each network port includes a flow control register 226, a port configuration register 228, and an output queue overflow base address register 230, each preferably implemented within the registers 74 of FIG. 2. Each network port may also include programmable pause length interval registers 242*a*, 242*b* and 242*c* for storing the short, medium and long PAUSE intervals, respectively. As described in detail below, the registers are programmable by the host 40 via the PCI interface 39. Hence, these registers and counters are implemented for each of the 10 Mb/s ports, the 100 Mb/s ports, and the management port, and the expansion bus interface port.

The watermark register 226 includes a high watermark register 226a (HIWTRMRK) for storing the high watermark level 300b, and a low watermark register 226b (LOWTRMRK) that stores the low threshold value 300a described above with respect to FIG. 4. Each port also includes a port configuration register 228 that specifies the operating characteristics of the corresponding output port. The port configuration register 228 includes an enable transmit bit 228a (ENTX) and an enable receive bit 228b (ENRX) accessible by the host 40 for enabling and disabling the corresponding network port. Hence, MAC layer of a network port is enabled for sending and receiving data packets with the corresponding network station 14 by setting the ENTX and ENRX bits to 1. Conversely, a network port can be taken "off-line" by setting the ENTX and ENRX bits to zero, effectively halting all transmission and reception activity by the corresponding network port.

Each port also includes an output queue overflow base address register 230 that stores the port overflow BASE address that defines the addressable overflow region 128 for the corresponding network port. As shown in FIG. 5, the external memory 34 is configured to have contiguous overflow regions. Hence, a given BASE address will define a boundary between a first overflow region and a second adjacent overflow region. Hence, changing the shared memory BASE address for a given port will reallocate overflow regions for network ports sharing adjacent overflow regions in the external memory 34. For example, the output queue overflow region 126 for port zero and the output queue overflow region 128 for port 1 are bounded by the BASE address for port 1. Assuming the PCI memory BASE address equals zero, a reduction in the overflow base address for port 1 will result in increasing the size of the output queue overflow region 128 for port 1 with a corresponding decrease in the size of the output queue overflow region 126 for port zero. Hence, adjusting the overflow BASE address for port 1 by decreasing the BASE address results in increasing the size of the overflow region 128 at the expense of the overflow region 126. Conversely, increasing the overflow BASE address for port 1 decreases the size of the overflow region 128 while increasing the size of the overflow region 126.

As shown in FIG. 6, each port also includes a plurality of statistical counters referred to as management information base (MIB) counters, that track events of each network port. These MIB counters, stored in the external memory 34 at an allocated region 132, include a receive packets (RcvPackets) counter 240, a receive octets (RcvOctets) counter 242, a transmit packets (TxPackets) counter 244, and a transmit octets (TxOctets) counter 246.

The receive packets counter 240 stores the number of packets received by a port, including unicast, broadcast, multicast, and errored packets. The receive octets counter 242 stores the number of bytes received by a port, namely the 8-bit quantities received after the start frame delimiter (SFD), including the frame check sequence (FCS) and the bytes from erroneous packets. The transmit packets counter 244 stores the number of packets transmitted from the corresponding port, but does not include packets transmitted with errors (e.g., collision fragments and partial packets due to transmit FIFO underruns). The transmit octets counter 246 stores the number of bytes transmitted from the corresponding port, excluding the preamble but including the FCS as well as bytes for erroneous packets.

Each network port maintains relatively small MIB counters within its corresponding MAC layer and periodically updates the corresponding counters in the external memory 132. Specifically, the multiport switch 12 accesses the external memory to capture the current counter's value, adds the on-chip counter's value, and writes the result back to the appropriate location in the external memory 132. The host 40 can then access the external memory to determine the accumulated value of the MIB counters.

Each of these counters stored in the memory location 132 of the external memory 34 are addressable by the host 40 via the PCI interface 39 and the external memory interface 32 as shown in FIG. 3. Since the SDRAM 34 is configured to have an address addressable by the PCI bus, the host 40 can perform a PCI burst transfer to and from any of the memory locations of the external memory 34.

As described below, the host 40 selectively allocates resources by setting the configuration registers to initial levels, clearing the MIB counters, enabling the network port for network traffic, and adjusting the allocation of resources by rewriting values in the appropriate configuration registers after monitoring the network activity over a prescribed interval as reflected in the MIB counters.

Figure 7A:
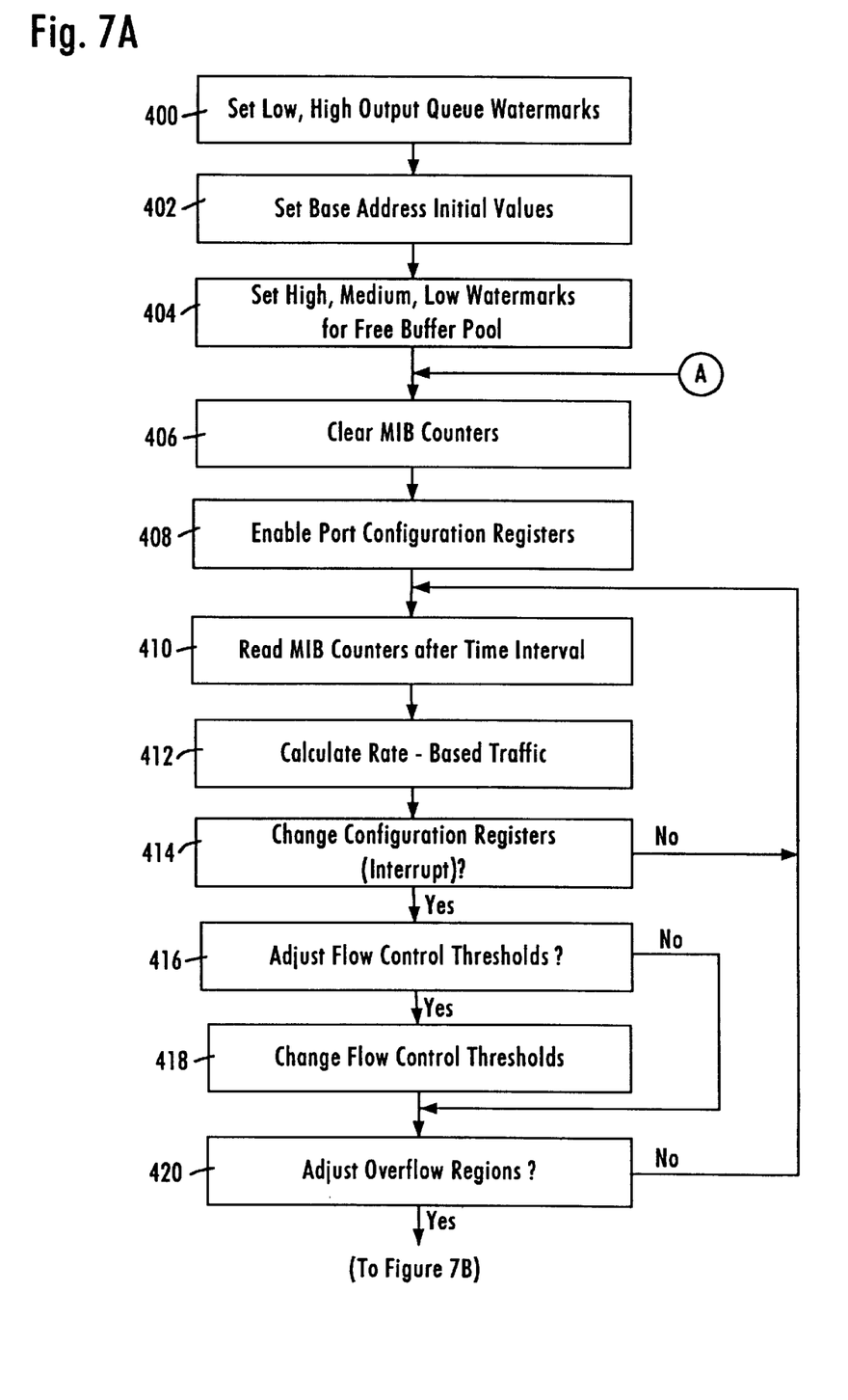
FIGS. 7A and 7B are flow diagrams of the method allocating resources for use by the network switch according to an embodiment of the present invention.
Figure 7B:
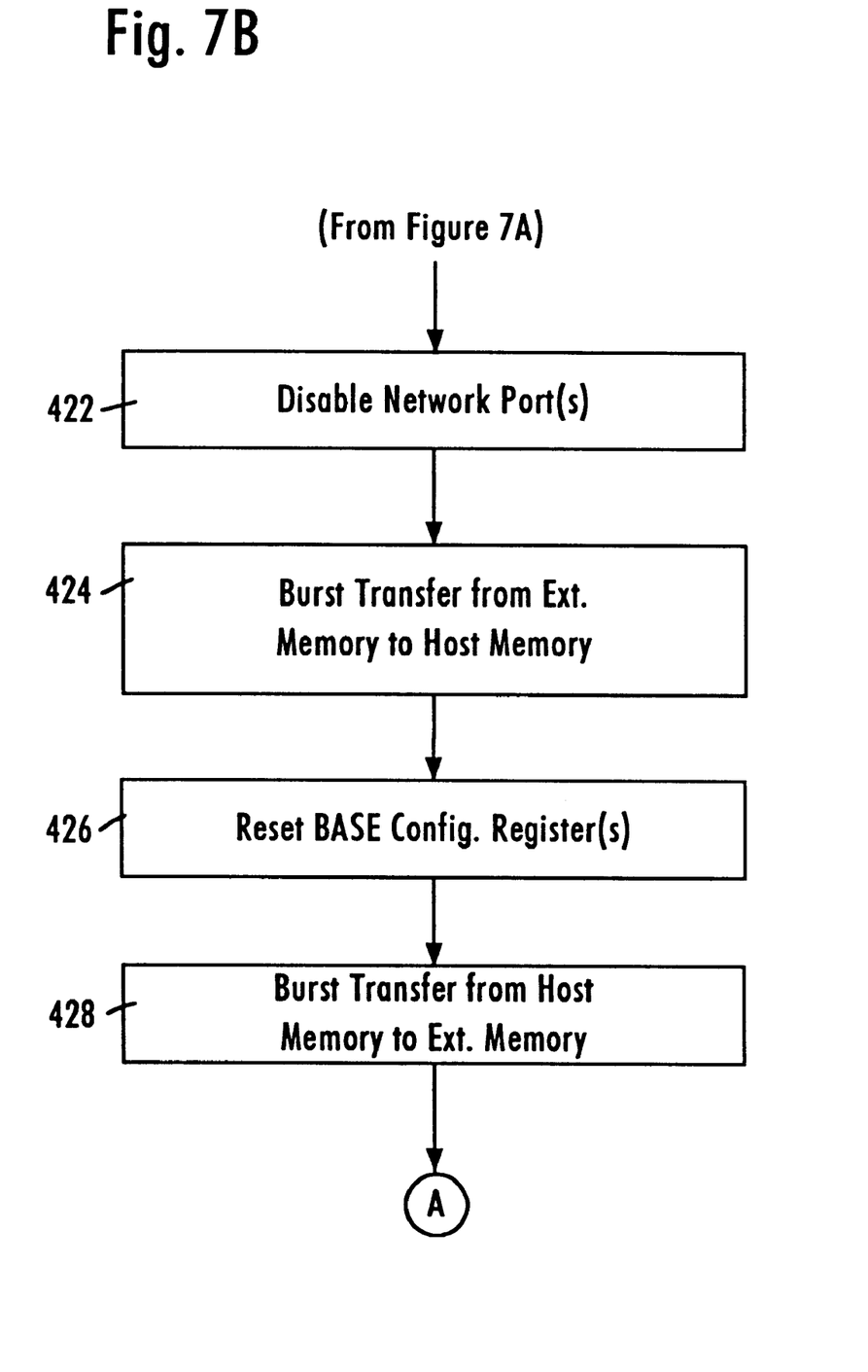

FIGS. 7A and 7B summarize a flow diagram illustrating the method of selectively allocating resources according to an embodiment of the present invention. The method begins in FIG. 7A by the host 40 initially setting the configuration registers. Specifically, the low and high watermarks 300a and 300b are initially set by the host 40 in step 400 by writing prescribed values into the respective registers 226b and 226a for each network port. The host 40 then configures the external memory 34 by writing initial base address values into overflow base address register 230 in step 402. The host 40 then sets the high, medium, and low watermarks 300e, 300d, and 300c for the free buffer pool in step 404 in registers 260a, 260b, and 270c, respectively. The host 40 may also set the PAUSE length registers 242 to selected values within a range including 0 to 65535 slot times.

The host 40 then clears in step 406 the MIB counters 240, 242, 244, and 246 in the external memory location 132, for example by clearing all the counter values to zero. After the host 40 clears the MIB counters in step 406, the host 40 enables the port configuration registers 228a and 228b in step 408 to begin traffic activity for the corresponding port. The host 40 then waits for a prescribed interval, and reads the values of MIB counters 240, 242, 244, and 246 from the memory location 132 in step 410 after the prescribed interval. The host 40 then calculates in step 412 rate based traffic based on the relative value of the MIB counters with respect to the prescribed time interval. Hence, the host 40 calculates for each port the number of packets received, the number of octets received with respect to a given unit in time. In addition, the host 40 also calculates for each port the number of packets transmitted and the number of octets transmitted with respect to the prescribed time interval. The host 40 is then able to compare the rate of transmission and reception of packets and octets in order to identify the most active network ports as well as the least active network ports.

After calculating the rate based traffic in step 412, the host 40 then determines whether the configuration registers should be changed in step 414. For example, the host 40 may decide reallocation is necessary if relevant rate-based traffic increases by a certain percentage; alternatively, the host 40 may decide reallocation is necessary in response to reception of an interrupt generated by the multiport switch 12 whenever a PAUSE frame or a phantom packet is output by a network port. If the host 40 determines that no change is necessary, then the host 40 returns to step 410 to continue monitoring of the MIB counters 240, 242, 244, and 246 over prescribed time intervals. However, if in step 414 the host 40 determines that the configuration registers should be changed, then the host 40 determines in step 416 whether the flow control thresholds should be adjusted. If in step 416 the host 40 determines that flow control should be changed, then the host 40 accesses the output queue registers 226 and/or the free buffer threshold registers 260 in step 418 in order to adjust the level at which flow control is initiated, (e.g., generating pause frames or phantom frames).

The host 40 then determines if the allocated overflow regions in the external memory should be adjusted in step 420. As shown in FIG. 7B, if the host 40 determines that the overflow regions should be adjusted, the host accesses the port configuration register 228 for the corresponding network port in step 422 to disable the network port by resetting the ENTX and ENRX bits to zero. The host 40 then performs a PCI burst transfer of the appropriate external memory contents in step 424 to a temporary memory, for example a memory location internal to the host 40. The host 40 then resets the configuration registers 230 for the corresponding network ports in step 426, and restores the contents from the temporary storage to the external memory in step 428. Depending on the location adjusted by the host 40, the PCI burst transfer may include restoring contents of frame pointers, MIB counters, data frames, etc.

The present invention provides an arrangement where resources in a multiport switch may be selectively allocated based on monitored network traffic. The host controller 40 is configured to selectively modify buffer overflow regions and flow control thresholds based on changes in rate-based traffic, generated based on periodic measurement of stored MIB values. Hence, network resources are efficiently allocated and adjusted as network traffic conditions vary.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

We claim:

1. A method for allocating resources for use by a network switch having a plurality of network ports serving respective network stations, the method comprising:
    setting overflow regions in a shared memory for the respective network ports, including storing shared memory start addresses in the network switch for each of the network ports: the shared memory start addresses defining the overflow regions for the respective network ports, and a boundary between a first overflow region and a second adjacent overflow region;
    monitoring network traffic encountered by the network ports over time; and
    adjusting the overflow regions within the shared memory based on the monitored network traffic, including halting the network traffic on the network ports corresponding to the first and second overflow regions, and transferring data from the first and second overflow region to a temporary storage.

2. The method of claim 1, further comprising:
    setting at least one flow control threshold for the network ports, wherein each network port is configured to selectively output a flow control signal based on the at least one flow control threshold relative to a corresponding amount of stored data for the network port; and
    adjusting the at least one flow control threshold based on the monitored network traffic.

3. The method of claim 2, wherein:
    the flow control threshold setting step comprises setting said at least one flow control threshold for each corresponding network port;
    the method further comprises adjusting for at least one of the network ports the corresponding at least one flow control threshold based on the monitored network traffic.

4. The method of claim 3, further comprising:
    setting a first queue threshold for a first queue configured for storing free frame pointers, the free frame pointers specifying respective memory locations available for storing received data frames in the shared memory, wherein at least one of the ports is configured to output a flow control signal based on a number of the free frame pointers stored in the first queue relative to the first queue threshold; and
    adjusting the first queue threshold based on the monitored network traffic.

5. The method of claim 4, further comprising:
    setting a second flow control threshold for each of the network ports less than the corresponding at least one flow control threshold, each network port configured to generate the flow control signal based on the corresponding amount of stored data relative to the second flow control threshold and the number of free frame pointers relative to the first queue threshold; and
    adjusting the second flow control threshold for at least one of the network ports based on the monitored network traffic.

6. The method of claim 1, wherein:
    the adjusting step comprises changing the shared memory start address for the first overflow region, and reallocating the first and second overflow regions.

7. The method of claim 6, wherein
    the changing step changes the shared memory start addresses for the first overflow region after the data is transferred to the temporary storage.

8. The method of claim 7, wherein the adjusting step further comprises restoring the data from the temporary storage to the reallocated first and second overflow regions based on the changed shared memory start address.

9. The method of claim 8, wherein:
    the network switch comprises a host interface enabling access by a host to the network switch and memory interface for enabling the host to access the shared memory via the host interface;
    the transferring step comprises retrieving the data from the first and second overflow region by the host via the host interface to the temporary storage as a PCI burst transfer.

10. The method of claim 9, wherein the restoring step comprises transferring the data from the temporary storage as a PCI burst transfer to the reallocated first and second overflow regions via the host interface and the memory interface.

11. The method of claim 10, wherein the shared memory is a discrete memory chip external to the network switch.

12. The method of claim 1, wherein the monitoring step comprises:
    setting at least one counter for each network port to a prescribed value, the at least one counter indicating a condition of the corresponding network port relative to the corresponding network station;
    reading an updated value from said at least one counter after a prescribed time; and
    determining the network traffic for each network port based on the prescribed value and the updated value of the corresponding counter relative to the prescribed time.

13. The method of claim 12, wherein the step of setting at least one counter comprises:

setting a first counter counting a number of data packets received by the network port from the corresponding network station; and setting a second counter counting a number of data bytes received by the network port from the corresponding network station.

14. The method of claim 13, wherein the step of setting at least one counter further comprises:

setting a third counter counting a number of data packets transmitted by the network port to the corresponding network station; and setting a fourth counter counting a number of data bytes transmitted by the network port to the corresponding network station.

15. The method of claim 1, wherein the monitoring step comprises detecting a flow control signal output by at least one of the network ports.

16. The method of claim 15, wherein the flow control signal is a pause frame output on a full duplex media.

17. The method of claim 15, wherein the flow control signal output by the at least one network port is a phantom frame output on a half duplex media causing a collision with the corresponding network station.

18. The method of claim 15, wherein the flow control signal detecting step comprises detecting an interrupt generated by the at least one network port.

19. A method for allocating resources for use by a network switch having a plurality of network ports serving respective network stations, the method comprising:

setting at least one flow control threshold for the network ports, wherein each network port is configured to selectively output a flow control signal based on the at least one flow control threshold relative to a corresponding amount of stored data for the network port;

setting first and second overflow regions in a shared memory for the respective network ports;

monitoring network traffic encountered by each of the network ports over time; and adjusting the at least one flow control threshold based on the monitored network traffic;

halting the network traffic on the network ports corresponding to the first and second overflow regions;

and transferring data from the first and second overflow region to a temporary storage.

20. The method of claim 19, wherein:

the setting step comprises setting said at least one flow control threshold for each corresponding network port;

the method further comprises adjusting for at least one of the network ports the corresponding at least one flow control threshold based on the monitored network traffic.

21. The method of claim 20, further comprising:

setting a first queue threshold for a first queue configured for storing free frame pointers, the free frame pointers specifying respective memory locations available for storing received data frames in an external memory, wherein at least one of the ports is configured to output a flow control signal based on the first queue threshold and a number of the free frame pointers stored in the first queue; and adjusting the first queue threshold based on the monitored network traffic.

22. The method of claim 21, further comprising:

setting a second flow control threshold for each of the network ports less than the corresponding at least one flow control threshold, wherein each network port generates the flow control signal based on the corresponding amount of stored data relative to the second flow control threshold and the number of free frame pointers relative to the first queue threshold; and adjusting the second flow control threshold for at least one of the network ports based on the monitored network traffic.

23. A system for allocating resources in a network having a plurality of network stations, the system comprising:

a network switch comprising:

(1) a plurality of network ports for sending and receiving data frames to and from the network stations, respectively, each of the network ports having a prescribed capacity for storing data associated with the corresponding data frames, each of the network ports generating transmission and reception data identifying characteristics of the corresponding sent and received data frames; and (2) a plurality of port overflow address registers for storing port overflow start addresses, the port overflow start addresses defining addressable overflow regions for storing overflow data from the respective network ports having reached the respective capacities; and a host for selectively configuring the port overflow address registers based on monitoring of the transmission and reception data from the respective network ports the host halting the network traffic on the network ports corresponding to first and second overflow regions defined by the port overflow start addresses, and transferring data from the first and second overflow regions to a temporary storage.

24. The system of claim 23, wherein the network switch further comprises programmable flow control threshold registers for the respective network ports, the host selectively configuring the programmable flow control threshold registers based on the monitoring of the transmission and reception data.

25. The system of claim 24, wherein the network switch further comprises a data bus for providing access by the host to the addressable overflow regions, the host interface configured to selectively read and write data via the data bus from and to the addressable overflow regions.

26. The system of claim 25, wherein the network switch further comprises counter configuration registers for storing counter start addresses, the counter start addresses defining addressable counter regions for storing the transmission and reception data for the network ports, respectively.

27. The system of claim 26, wherein the host interface is configured to selectively read via the data bus the transmission and reception data from the addressable counter regions at prescribed intervals to generate network traffic data with respect to time.

28. The system of claim 24, wherein the network switch generates an interrupt signal in response to a flow control signal generated by one of the network ports, the host configuring at least one of the port overflow address registers and the programmable flow control in response to the interrupt signal.

29. The system of claim 23, further comprising a discrete memory having addressable locations corresponding to the addressable overflow regions for storing the overflow data.

* * * * *